US012241136B2

(12) United States Patent
Olsson

(10) Patent No.: US 12,241,136 B2
(45) Date of Patent: Mar. 4, 2025

(54) METHOD AND SYSTEM FOR COOLING HOT OBJECTS

(71) Applicant: Infrasonik AB, Spånga (SE)

(72) Inventor: Mats Olsson, Lidingö (SE)

(73) Assignee: INFRASONIK AB, Spånga (SE)

( * ) Notice: Subject to any disclaimer, the term of this patent is extended or adjusted under 35 U.S.C. 154(b) by 951 days.

(21) Appl. No.: 16/973,048

(22) PCT Filed: Jun. 5, 2019

(86) PCT No.: PCT/SE2019/000007
§ 371 (c)(1),
(2) Date: Dec. 8, 2020

(87) PCT Pub. No.: WO2019/245418
PCT Pub. Date: Dec. 26, 2019

(65) Prior Publication Data

US 2021/0277493 A1 Sep. 9, 2021

(30) Foreign Application Priority Data

Jun. 21, 2018 (SE) .................................... 1850767-3

(51) Int. Cl.
*C21D 9/00* (2006.01)
*B06B 1/14* (2006.01)
(Continued)

(52) U.S. Cl.
CPC .............. *C21D 9/0018* (2013.01); *B06B 1/14* (2013.01); *B21D 37/16* (2013.01); *C21D 1/04* (2013.01);
(Continued)

(58) Field of Classification Search
None
See application file for complete search history.

(56) References Cited

U.S. PATENT DOCUMENTS 4,359,962 A * 11/1982 Olsson ...................... B06B 1/20 134/1
4,517,915 A 5/1985 Olsson et al.
(Continued)

FOREIGN PATENT DOCUMENTS

EP 0006833 A2 1/1980
EP 0441837 A1 8/1991
(Continued)

OTHER PUBLICATIONS

Cut and Couple, Furnace door coolant hose (Year: 2017).*
(Continued)

*Primary Examiner* — Steven S Anderson, II
*Assistant Examiner* — Kurt J Wolford
(74) *Attorney, Agent, or Firm* — MEDLER FERRO WOODHOUSE & MILLS PLLC

(57) ABSTRACT

Apparatus (1) for cooling an automobile component (20) by means of a gas, the apparatus comprising a cooling box (11) with a re-closeable opening (12) for receiving an automobile component (20) to be cooled, wherein at least one heat sink (13) is provided inside the cooling box (11) for cooling of the gas, and wherein the apparatus (10) includes at least one infra sound pulsator (2,3) arranged to provide an infra sound into said cooling box (11) to improve heat exchange of the gas both with a cooling surface of the at least one heat sink (13), and with the automobile component (20).

13 Claims, 3 Drawing Sheets

(51) Int. Cl.

| | |
|---|---|
| ***B21D 37/16*** | (2006.01) |
| ***C21D 1/04*** | (2006.01) |
| ***C21D 1/09*** | (2006.01) |
| ***C21D 1/62*** | (2006.01) |
| ***F27D 9/00*** | (2006.01) |
| ***F27D 15/00*** | (2006.01) |
| ***F27D 15/02*** | (2006.01) |
| ***F28D 21/00*** | (2006.01) |
| ***F28F 13/10*** | (2006.01) |
| ***G10K 9/02*** | (2006.01) |
| ***G10K 9/04*** | (2006.01) |
| ***G10K 15/04*** | (2006.01) |

(52) U.S. Cl.

CPC ................. *C21D 1/09* (2013.01); *C21D 1/62* (2013.01); *C21D 9/0062* (2013.01); *F27D 15/00* (2013.01); *F27D 15/02* (2013.01); *F27D 15/0206* (2013.01); *F28F 13/10* (2013.01); *G10K 15/04* (2013.01); *F27D 2009/0075* (2013.01); *F28D 2021/0078* (2013.01); *G10K 9/02* (2013.01); *G10K 9/04* (2013.01)

(56) References Cited

U.S. PATENT DOCUMENTS

| | | | | |
|---|---|---|---|---|
| 4,653,732 | A * | 3/1987 | Wunning | C21D 9/0062 266/259 |
| 5,003,808 | A | 4/1991 | Maher | |
| 6,176,365 | B1 | 1/2001 | Klemm | |
| 7,448,489 | B2 | 11/2008 | Reichenbach | |
| 9,694,408 | B2 | 7/2017 | Trippe et al. | |
| 10,526,677 | B2 | 1/2020 | Frost et al. | |
| 10,954,577 | B2 | 3/2021 | Frost et al. | |
| 11,261,502 | B2 * | 3/2022 | Olsson | C21D 1/09 |
| 2007/0220903 | A1 * | 9/2007 | Watanabe | F25B 9/14 62/6 |
| 2011/0283851 | A1 | 11/2011 | Overrath et al. | |
| 2012/0006089 | A1 | 1/2012 | Pohl et al. | |
| 2012/0023748 | A1 | 2/2012 | Pohl et al. | |
| 2014/0124104 | A1 | 5/2014 | Trippe et al. | |
| 2016/0076116 | A1 | 3/2016 | Baettenhausen et al. | |
| 2017/0183755 | A1 | 6/2017 | Frost et al. | |

FOREIGN PATENT DOCUMENTS

| | | | | | |
|---|---|---|---|---|---|
| EP | 3067128 | A1 | | 9/2016 | |
| GB | 2448501 | A | * | 10/2008 | F26B 15/12 |
| JP | 05-280886 | A | | 10/1993 | |
| JP | H05280886 | A | * | 10/1993 | |
| JP | 2010210105 | A | | 9/2010 | |
| JP | 2015038547 | A | | 2/2015 | |
| KR | 20110075732 | A | | 7/2011 | |
| RU | 2153010 | C1 | | 7/2000 | |
| SE | 462374 | B | | 12/1989 | |
| WO | 90/05275 | A1 | | 5/1990 | |
| WO | 90/05277 | A1 | | 5/1990 | |
| WO | WO-9118254 | A1 | * | 11/1991 | |
| WO | 2008081705 | A1 | | 7/2008 | |

OTHER PUBLICATIONS

JP-H05280886-A English translation (Year: 1993).*

ISR: Stockholm Patent Office; Oct. 1, 2019.

Swedish Search Report—Dec. 14, 2018.

European Search Report; The Hague ;—Apr. 7, 2021.

* cited by examiner

METHOD AND SYSTEM FOR COOLING HOT OBJECTS

TECHNICAL FIELD

The invention relates to a method and system for cooling hot solid objects.

BACKGROUND

In the manufacturing industry objects are often processed in steps. One step being a cooling step.

Normally, air cooling is used, which in many cases is time consuming.

In EP 3 067 128 B1 a press system is described in which a cooling tool and a pressing tool are arranged side by side in an arrangement where a hot steel blank is passed through several steps. The arrangement increases the efficiency in that that the cooling step may be performed more quickly than in prior art arrangements. A challenge related to this method is to achieve a homogenous cooling of the steel blank, and for cooling of steel products the cooling rate is of outermost importance as it may govern the properties of the steel product.

As discussed above, air cooling is generally too slow for an efficient cooling, especially in a process where several steps are performed after each other. There are however methods of improving the rate of cooling in air cooling.

It is inter alia known to improve air cooling by means of the application of infra sound in order to increase heat exchange with the surrounding air. In SE 462 374 B a low frequency sound generator is described. This is advantageous but has hitherto not been successfully implemented in an industrial application.

Hence there is a need of a cooling process that reduces the time needed to cool hot objects.

SUMMARY OF THE INVENTION

The purpose of the present invention is to provide process and apparatus that provides an improved air cooling of hot objects. This is achieved by means of an inventive method and apparatus.

According to a first aspect the invention relates to a process for manufacturing an automobile component, the process comprising the step of cooling said component in a confined space, said cooling involving cooling by means of a gas, the gas being cooled by heat exchange with a cooling surface of a heat sink inside said confined space, wherein a low frequency sound wave is provided into said confined space in order to improve heat exchange with the cooling gas.

In the inventive the cooling is achieved without the use of a forced air flow. Instead, the invention is based on the idea of cooling by heat exchange with heat sinks arranged close to the object to be cooled. This is advantageous as it enhances an even heat exchange. In a forced air flow, e.g. produced by a fan, a protective film may be produced along the surface of the item to be cooled, which film will impair the heat exchange with the surrounding air. Therefore, cooling by means of infra sound in the absence of a forced airflow is a very efficient way of air cooling hot objects.

In a specific embodiment the process involves the step of cooling said gas by means of a cooling surface with an area that exceeds a total envelope area of said component.

In a specific embodiment the sound wave has a frequency that is lower than 50 Hz, preferably lower than 25 Hz.

The sound wave is preferably provided from a first end of the confined space so as to propagate through the confined space and away at a second end of the confined space, opposite to said first end thereof.

According to a second aspect the invention relates to an apparatus for cooling an automobile component by means of a gas, the apparatus comprising a cooling box with an opening for receiving an automobile component to be cooled, wherein at least one heat sink is provided inside the cooling box for cooling of the gas, and wherein the apparatus includes at least one infra sound pulsator arranged to provide an infra sound into said cooling box to improve heat exchange of the gas both with a cooling surface of the at least one heat sink, and with the automobile component.

In a specific embodiment a total cooling surface of the at least one heat sink is larger than the area of the opening of the cooling box.

In a specific embodiment the inner walls of the cooling box forms part of the at least one heat sink.

In a specific embodiment the apparatus comprises a gripper unit with at least one gripper arm arranged to grip the automobile component at a location outside the cooling box, move said component into the cooling box and, after cooling, move said component to a location outside the cooling box, the at least one gripper arm being arranged to extend into said cooling box during cooling.

In a specific embodiment the apparatus comprises a door arranged to close the opening of the cooling box, said door being connected to the gripper unit so as to introduce the component into the cooling box by said gripper unit and simultaneously close said opening of the cooling box in one related movement. The door may have an inner surface with a heat sink forming part of the cooling surface, flexible cooling conduits being arranged to provide a cooling fluid to cool said heat sink of the door.

In a specific embodiment the first infra sound pulsator is connected to the cooling box via a first resonator conduit. A second infra sound pulsator may connected to the cooling box via a second resonator conduit.

The first infra sound pulsator may be a P-pulsator and the second infra sound pulsator may be a S-pulsator.

In another specific embodiment both the first infra sound pulsator and the second infra sound pulsator are PS-pulsators.

In a specific embodiment both the first infra sound pulsator and the second infra sound pulsator include a cylinder and a piston that is arranged to move inside said cylinder to produce said infra sound.

In a specific embodiment both the first resonator conduit and the second resonator conduit are connected to a common infra sound pulsator, said pulsator including a cylinder and a piston that is arranged to move inside said cylinder to produce said infra sound, and wherein the first resonator conduit and the second resonator conduit are connected to opposite ends of said common infra sound pulsator.

Preferably, the first and second resonator conduits are of similar lengths, wherein a standing wave is produced from the first infra sound pulsator to the second infra sound pulsator and wherein the first infra sound pulsator is arranged to produce a standing wave of a wavelength that corresponds to a combined length of the first and second resonator conduits and the cooling box.

In a specific embodiment the first infra sound pulsator is arranged to produce a standing wave of which half a wavelength corresponds to the combined length of the first and second resonator conduits and the cooling box.

Typically, the process and apparatus are adapted to the cooling of automobile components such as plates or preformed parts of steel, aluminium, zinc-plated steel and the like.

Other embodiments and advantages will be apparent from the detailed description and the appended drawings.

BRIEF DESCRIPTION OF DRAWINGS

An exemplary embodiment related to the invention will now be described with reference to the appended drawings, in which.

DETAILED DESCRIPTION OF EMBODIMENTS

Figure 1:
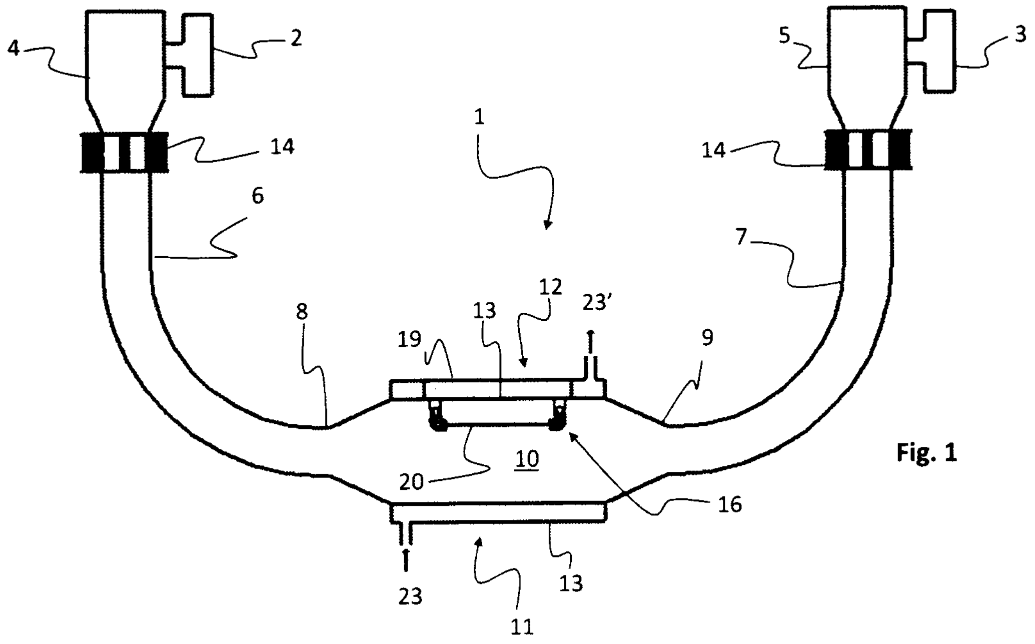
FIG. 1 is a schematic view of an embodiment of an apparatus for cooling hot objects.

FIG. 1 shows an apparatus 1 for cooling objects, such as an automobile component 20 by means of a cooling gas, e.g. air or any other gas, with or without steam. The apparatus comprises a confined space 10 arranged inside a cooling box 11 with an opening 12 for receiving an item to be cooled, specifically an automobile component 20. Preferably, the opening is re-closable. At least one heat sink 13 is provided inside the cooling box 11 for cooling the gas. The apparatus 10 includes at least one infra sound pulsator 2 and 3 arranged to provide an infra sound into said cooling box 11 to improve heat exchange between the cooling gas and a cooling surface of the at least one heat sink 13, as well as between the cooling gas and the automobile component 20 to be cooled.

In order to achieve an efficient cooling, the total cooling surface of the heat sink 13 is larger than the area of the opening 12 of the cooling box 11. Namely, if the cooling surface of the heat sink 13 is larger than the area of the opening 12 it will at least be larger than a main dimension of the automobile component 20 to be cooled, in view of that said automobile component 20 is arranged to be entered through said opening. However, preferably a plurality of heat sinks 13 are arranged, and said heat sinks 13 may also include cooling flanges, increasing the overall cooling surface. It is obvious to a skilled person that the cooling efficiency will increase with an increased total cooling surface of the heat sink(s) 13, but that cooling will have effect also with a small cooling surface of only one heat sink.

As is illustrated in FIG. 1, the inner walls of the cooling box 11 forms part of the heat sink 13. In the shown embodiment, the upper and lower walls both comprise a heat sink 13 at their inner surfaces. To further increase the cooling effect all, or at least most of, the inner surfaces of the cooling box 11 may be comprised of, or include, heat sinks.

A door 19 is arranged to close the opening 12 of the cooling box 11. In the shown embodiment, an inner surface of the door 19 comprises a heat sink 13 forming part of the cooling surface. Flexible cooling conduits (not shown) may be arranged to provide a cooling fluid to cool said heat sink 13 of the door.

In an alternative, not shown, embodiment the opening is comprised of at least one elongate aperture arranged to receive a steel blank or the like sideways into the confined space of the cooling box. Also, the cooling box may be provided with two such openings, which are preferably arranged opposed to each other on the cooling box, such that the object to be cooled may be entered at one side of the cooling box and taken out, after cooling, at the opposite side of the cooling box. This alternative embodiment is hence specifically adapted to efficient cooling of blanks, such as steel sheets.

A first infra sound pulsator 2 is connected to the cooling box 11 via a first resonator conduit 6, wherein the first infra sound pulsator 2 is arranged at a first outer end 4 of said first resonator conduit 6. A second infra sound pulsator 3 is connected to the cooling box 11 via a second resonator conduit 7, said second infra sound pulsator 3 being arranged at a second outer end 5 of said second resonator conduit 7.

The first and second resonator conduits 6 and 7 may be tubular, having substantially the same cross section along their whole length. They may however include passages of varying cross sections. A transition from one cross-sectional area to another cross-sectional area may be called a diffuser. In the shown embodiment such diffusers are arranged both at the outer ends 4 and 5, respectively, of the first and second resonator conduits 6 and 7, and at the transition between the resonator conduits and the confined space 10 of the cooling box 11. The tubular resonators may be bent or straight.

A vibration damper 14 is arranged at each outer end 4 and 5 of the respective first and second resonator conduits 6 and 7. The vibration dampers 14 are arranged to reduce the vibrations that arise from the pulsations of the pulsators and the thus produced sound waves. The vibration dampers 14 may comprise weights that are suspended in springs allowed to oscillate under the counter action of the springs in a direction that is parallel to the direction of the oscillations created as a function of the sound waves, and hence parallel to an axial direction of the first and second resonator conduits 6 and 7, respectively.

Figure 2:
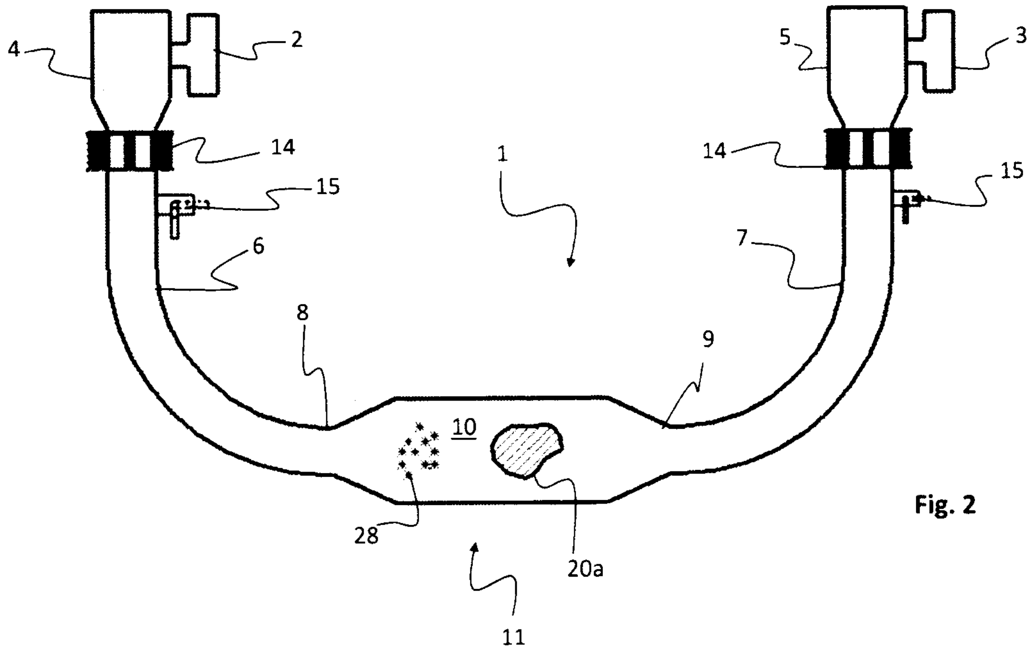
FIG. 2 is a schematic view of an alternative embodiment of an apparatus for cooling hot objects.

In FIG. 2, an alternative second embodiment of an apparatus 1 for cooling is schematically shown. For most parts, the second embodiment is identical to the first embodiment shown in FIG. 1. In FIG. 2 the item to be cooled 20*a* is an item of an irregular shape, which is cooled by a cooling gas 28, illustrated as a mist, event though for most cases the cooling gas is a dry, invisible gas, such as air. In the second embodiment fizzle valves 15 are arranged at the outer ends 4 and 5 of the first and second resonator conduits 6 and 7, respectively. The fizzle valves 15 are inter alia arranged to dampen sound emittance from the system when the opening is open. Namely, when the opening is open a quite loud sound may escape through said opening. The fizzle valves 15 will allow the sound waves to decrease in amplitude. The fizzle valves 15 are arranged to be opened at the same time as the opening 12 is opened.

To preserve the standing sound wave one of the fizzle valves 15 may be dominant in that it has a greater opening than the fizzle valve at the opposite end. Namely, the act of opening of the door 19 and the fizzle valves 15 may affect the wavelength of the sound waves inside the system. When the opening 12 and the fizzle valves 15 are re-closed it may take some time before the standing wave of the desired wavelength will again propagate inside the system, between the outer ends of the first and second resonator conduits 6 and 7. In order to keep this time to a minimum it is desired to preserve the standing wave to a great degree during the opening. This is achieved, at least in part, by the opening of the fizzle valves 15 whenever the opening 12 is open. Further, it is advantageous to minimize the time that the opening 12 is open, i.e. to minimize the time between the exiting of a cooled item and the insertion of a new item to be cooled.

Now, with reference to FIGS. 3 and 4 a cooling box 11 of an apparatus as shown in FIGS. 1 and 2 will be described in closer detail.

The shape of the confined space 10 of the cooling box 11 may be adapted to the shape of the item to be cooled. If the item to be cooled is an elongate object it has proven efficient to have a slightly tapered shape of the confined space, with a waist at its middle. Hence, in contrast to the embodiments shown in FIGS. 1 and 2, in which the cross-sectional area is wider at the confined space 10 of the cooling box 11, it may instead have the same width or be thinner at the confined space 10 of the cooling box 11.

Figure 3:
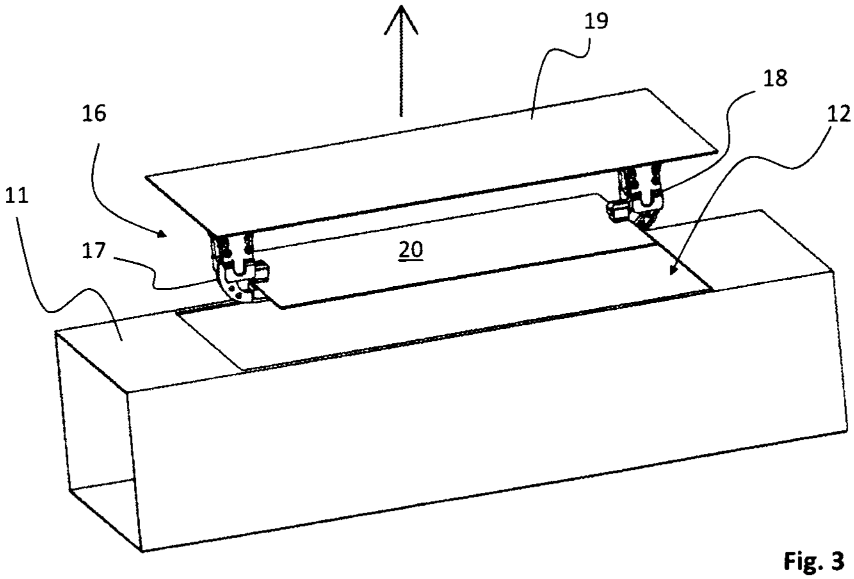
FIGS. 3-4 are schematic views of a cooling box to be used in the apparatus shown in FIG. 1.
Figure 4:
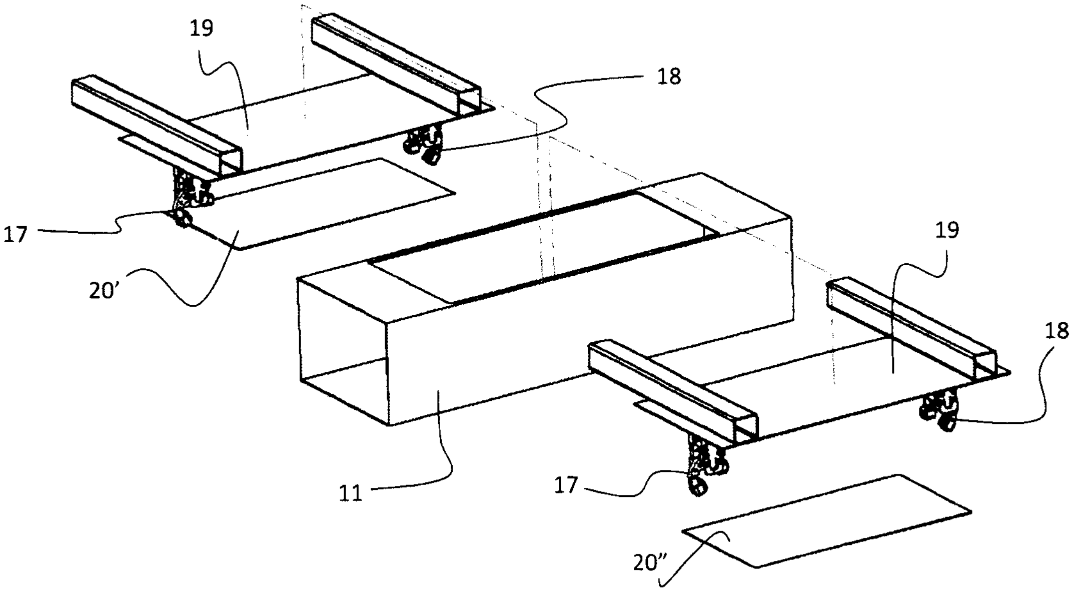

In the embodiments shown in FIGS. 3 and 4, the cooling box 11 has the shape of a cuboid, with at major extension in a direction parallel to the direction of the sound wave. This is a useful shape for e.g. steel blanks or the like, which may be easily fitted inside such a shape.

The cooling box 11 includes an opening 12 protected by a door 19. A gripper unit 16 with at least one gripper arm 17,18 is arranged to grip an automobile component 20' to be cooled at a location outside the cooling box 11. By means of said gripper unit 16 said component 20' is moved into the cooling box 11 and, after cooling, the now cooled component 20" is moved to a location outside the cooling box 11. The gripper arms 17,18 are arranged to extend into said cooling box 11 during cooling.

In the shown embodiment, the door 19 arranged to close the opening 12 of the cooling box 11 is connected to the gripper unit 16 so as to introduce the component into the cooling box 11 by said gripper unit 16 and simultaneously close said cooling box 11 in one related movement. In the embodiment shown in FIG. 4, two doors with integrated gripper units 16 are provided. This is advantageous as it minimizes the time the opening is open so as to maximize the run time of the cooling box 11. Further, the fact that the opening is open for a short period of time will provide the possibilities of maintaining the standing wave inside the cooling box 11 as intact as possible, such that the standing may continue to propagate instantly or shortly after closing of the door 19.

In FIGS. 5-10 three different types of pulsators are shown. An infra sound pulsator 2 may be a P-pulsator or a S-pulsator. A P-pulsator is pulsator that pumps in air pulses and a S-pulsator is a pulsator that pumps out or release air pulses. A pulsator that alternatively pumps in or pumps out air pulses is called a PS-pulsator. Either one P-pulsator and one S-pulsator is arranged at opposite ends of the system, or a PS-pulsator is arranged at both ends. The pulsators at opposite ends need to be synchronized with each other such that the standing wave may be withheld between the pulsators. Normally, this synchronization is set by allowing the pulsators swing in the natural pace governed by the standing and to enhance the movement by the addition of a force in the direction of said natural pace.

Figure 5:
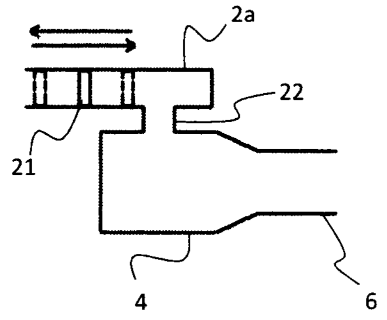
FIG. 5 shows a first embodiment of a pulsator to be used in the apparatus of FIGS. 1-2.

In FIG. 5, a first type of PS pulsator 2*a* is shown. A piston 21 that moves back and forth inside a cylinder is arranged to act as a PS-pulsator. The shown pulsator 2*a* is provided at a first outer end 4 of the first tubular resonator conduit 6. Preferably a corresponding PS-pulsator is provided at the opposite end at the second outer end 5 of the second tubular resonator conduit 7. The opposed PS-pulsators are arranged to work out of phase with each other such that one of them is at its innermost position when the other is at its outermost position. With the interaction the pulsators will be a half wavelength out of phase with respect to each other. Thereby a standing wave a half wavelength will be produced between the respective outer ends 4 and 5 of the tubular resonator conduits 6 and 7, respectively.

Figure 6:
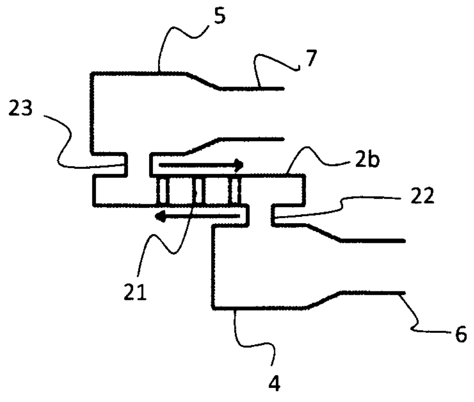
FIG. 6 shows a second embodiment of a pulsator to be used in the apparatus of FIGS. 1-2.

In FIG. 6 an alternative pulsator 2*b* is shown, which pulsator is connected to both the first outer end 4 of the first resonator conduit 6 and the second outer end 5 of the second resonator conduit 7. With this configuration the piston will provide a pressure into one outer end 4 of a resonator conduit and simultaneously release pressure from the outer end of the other resonator conduit.

In FIGS. 7-10 a specific type of pulsator 2*c* for producing sound waves of high intensity is shown in different modes. The pulsator 2*c* includes a spring biased piston 26. The pulsator 2*c* includes an inlet chamber 24 with a valve inlet opening 29 and an outlet chamber 25 with a valve outlet opening 30. The spring biased piston 26 includes a piston port 31, which is arranged to face the valve inlet opening 29 and the valve outlet opening 30. The inlet chamber 24 is connected to a continuous pressure source (not shown) and the outlet chamber 25 is connected to a continuous negative pressure source (not shown).

As the spring biased piston 26 moves the piston port 31 alternatively connects the inlet chamber 24 via the valve inlet opening 29 to the inside of the piston 26, or the outlet chamber 25 via the valve outlet opening 30 to the inside of the piston 26. The connection between the valve inlet opening 29 and the inlet chamber 24 to the inside of the piston 26 is governed by the position of the spring biased piston 26. The openings are arranged such that only one of the valve inlet opening 29 and the valve outlet opening 30 is in line with the piston port 31 at a time.

Figure 7:
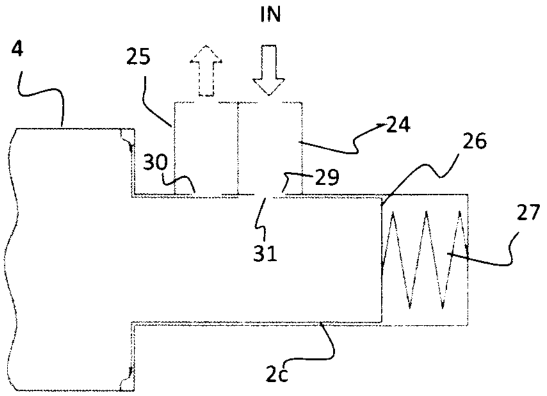
FIGS. 7-10 show a third embodiment of a pulsator in different working modes.

In FIG. 7 the spring biased piston 26 is in its innermost position, in which a spring 27 that holds the spring biased piston 26 is in its most compressed state. From this position the spring 27 will act on the spring biased piston 26 so as to push it inwards to compress the air in the outer end 4 of the first resonator conduit 6 so as to create a pulse in the first resonator conduit 6, past the cooling box 11 and through the second resonator conduit 7.

In the position shown in FIG. 7 the piston port 31 is positioned in line with the valve inlet port 29 to connect inlet chamber 24 to the inside of the piston 26 so as to further increase the pressure in the resonator conduits and to build on the standing wave in said resonator conduits.

Figure 8:
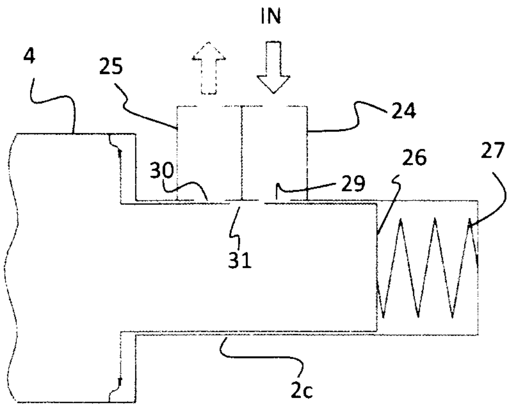

In the position shown in FIG. 8 the piston 26 has moved from its outermost position and is still accelerating in its movement inwards towards the resonator conduit so as to further compress the air in said resonator conduit. The piston port 31 is still positioned at least partly in line with the valve inlet port 29 to connect inlet chamber 24 to the inside of the piston 26 so as to further increase the pressure in the resonator conduits In the position shown in FIG. 9 the piston 26 has moved to a position where the spring 27 has started to act outwards, i.e. in the opposite direction of the movement of the piston 26, so as to decelerate the movement of said piston 26. Further, at substantially the same position as the un-biased position of the spring is passed, the piston port 31 passes from connection to the valve inlet port 29 into connection to the valve outlet port 30, such that air will be sucked from the inside of the piston 26 via the valve outlet port 30 into the outlet chamber and on to the negative pressure source (not shown).

Figure 10:
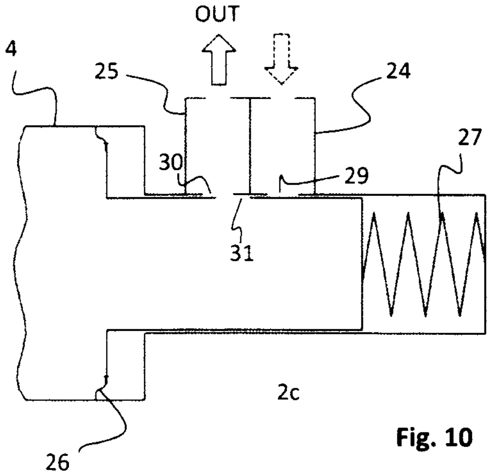

In the position shown in FIG. 10 the piston 26 has moved to its innermost position, from which position it will return and start moving outwards. The spring 27 is extended, acting to pull the piston 26 outwards so as to relieve the pressure in the resonator conduits and the action is enhanced in that the piston port 31 is connected to the valve outlet port 30, such that air will be sucked from the inside of the piston 26 towards the outlet chamber 25.

Figure 9:
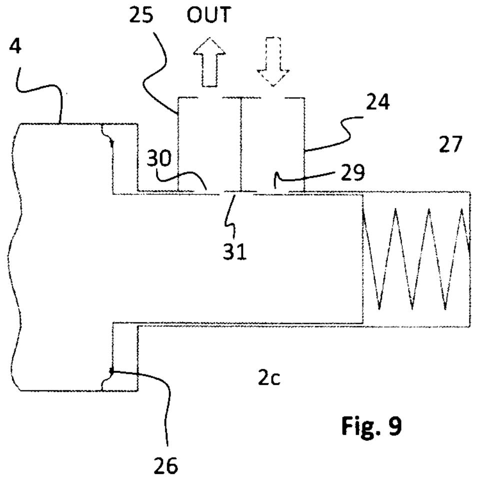

From the position shown in FIG. 10 the piston 26 will move reversely towards the position shown in FIG. 7 via the positions shown in FIGS. 9 and 8, respectively. The pulsator 2*c* is hence self-regulating in that the standing wave of half a wave-length will be produced and withheld by means of the pulsator 2*c* and a corresponding pulsator at the opposite end of the resonator conduits, wherein the other pulsator will be self-regulated to lie one half-length out of phase with the first pulsator 2*c*.

As illustrated in FIGS. 1 and 2 the first and second resonator conduits 6 and 7 are preferably of similar lengths and a standing wave is produced from the first infra sound pulsator 2 to the second infra sound pulsator 3, wherein the first infra sound pulsator 2 is arranged to produce a standing wave of which half a wavelength corresponds to a combined length of the first and second resonator conduits 6 and 7 and the cooling box 11. Hence, the first and second pulsators 2 and 3 are out of phase with each other with half a wave-length.

The wavelength of the standing wave is, as is apparent from the above, dependent of the length of the system, i.e. the length between the first end second pulsator 2 and 3, respectively. Preferably, the frequency is 50 Hz or less, which would yield a sound with a wavelength of 6.8 metre and hence demand a length of 3.4 metre between the pulsators. The cooling effect will however increase with a lower frequency and in a specific embodiment the length between the pulsators is about 8.5 metre which will yield a sound wave of a frequency of about 20 Hz. To achieve a very high cooling efficiency the frequency could be kept at 20 Hz or below, and the combined length of the first and second resonator conduits 6 and 7 and the cooling box 11 should therefore be about 8.5 metre or more to obtain said very high cooling efficiency.

Above, the invention has been described with reference to specific embodiments. The invention is however not limited to these embodiments. It is obvious to a person skilled in the art that other embodiments are possible within the scope of the following claims.

REFERENCE NUMERALS

1. Apparatus
2. First infra sound pulsator
3. Second infra sound pulsator
4. First outer end
5. Second outer end
6. First tubular resonator conduit
7. Second tubular resonator conduit
8. First sound port of cooling box
9. Second sound port of cooling box
10. Confined space
11. Cooling box
12. Opening of cooling box
13. Heat sink
14. Vibration damper
15. Fizzle valve
16. Gripping unit
17. First gripper arm
18. Second gripper arm
19. Door of cooling box
20. Item to be cooled
21. Piston of cylindrical pulsator
22. First pulsator port
23. Second pulsator port
24. Inlet chamber
25. Outlet chamber
26. Spring biased piston
27. Spring
28. Cooling gas
29. Valve inlet port
30. Valve outlet port
31. Piston port

The invention claimed is:

1. An apparatus for cooling an object by means of a gas, the apparatus comprising a cooling box with only one opening adapted to receive an object to be cooled and to remove the object after being cooled, wherein at least one heat sink is provided inside the cooling box for cooling of the gas, wherein the apparatus includes at least one infra sound pulsator arranged to provide an infra sound into said cooling box to improve heat exchange both between the gas and a cooling surface of the at least one heat sink, and between the gas and the object.

2. The apparatus according to claim 1, wherein a total cooling surface of the at least one heat sink is larger than the area of the opening of the cooling box.

3. The apparatus according to claim 1, wherein inner wall of the cooling box forms part of the at least one heat sink.

4. The apparatus according to claim 1, wherein the apparatus comprises a door arranged to close the opening of the cooling box, said door having an inner surface with a heat sink forming part of the cooling surface, flexible cooling conduits being arranged to provide a cooling fluid to cool said heat sink of the door.

5. The apparatus according to claim 1, wherein a first infra sound pulsator is connected to the cooling box via a first resonator conduit.

6. The apparatus according to claim 5, wherein a second infra sound pulsator is connected to the cooling box via a second resonator conduit.

7. The apparatus according to claim 6, wherein both the first infra sound pulsator and the second infra sound pulsator are PS-pulsators.

8. The apparatus according to claim 7, wherein both the first infra sound pulsator and the second infra sound pulsator include a cylinder and a piston that is arranged to move inside said cylinder to produce said infra sound.

9. The apparatus according to claim 6, wherein the first and second resonator conduits are of similar lengths and wherein a standing sound wave is produced from the first infra sound pulsator to the second infra sound pulsator and wherein the first infra sound pulsator is arranged to produce a standing sound wave of a wavelength that corresponds to a combined length of the first and second resonator conduits and the cooling box.

10. The apparatus according to claim 9, wherein the first infra sound pulsator is arranged to produce a standing sound wave of which half a wavelength corresponds to the combined length of the first and second resonator conduits and the cooling box.

11. The apparatus according to claim 1, wherein a common infra sound pulsator is connected to the cooling box via a first resonator conduit and a second resonator conduit, said pulsator including a cylinder and a piston that is arranged to move inside said cylinder to produce said infra sound, and wherein the first resonator conduit and the second resonator conduit are connected to opposite ends of said common infra sound pulsator.

12. An apparatus for cooling an object by means of a gas, the apparatus comprising a cooling box with an opening for receiving an object to be cooled, wherein at least one heat sink is provided inside the cooling box for cooling of the gas, wherein the apparatus includes at least one infra sound pulsator arranged to provide an infra sound into said cooling box to improve heat exchange both between the gas and a cooling surface of the at least one heat sink, and between the gas and the object, and wherein the apparatus comprises a gripper unit with at least one gripper arm arranged to grip the object at a location outside the cooling box, move said component into the cooling box through the opening and, after cooling, move said component through the opening to a location outside the cooling box, the at least one gripper arm being arranged to extend into said cooling box during cooling.

13. The apparatus according to claim 12, wherein the apparatus comprises a door arranged to close the opening of the cooling box, said door being connected to the gripper unit so as to introduce the object into the cooling box by said gripper unit and simultaneously closing said cooling box in one related movement.

* * * * *